United States Patent [19]

Cheneviere et al.

[11] Patent Number: 5,299,638
[45] Date of Patent: Apr. 5, 1994

[54] PROCESS FOR TRANSPORTING PARTICLES IN A POROUS MEDIUM

[75] Inventors: Pascal Cheneviere, Nancy; Jacques-Philippe De Farcy De Malnoe, Auzielle; Antide Putz, Pau; Michel Sardin, Laxou, all of France

[73] Assignee: Societe Nationale Elf Aquitaine, Courbevoie, France

[21] Appl. No.: 849,367

[22] PCT Filed: Jul. 9, 1990

[86] PCT No.: PCT/FR90/00802
§ 371 Date: Jun. 2, 1992
§ 102(e) Date: Jun. 2, 1992

[87] PCT Pub. No.: WO91/07570
PCT Pub. Date: May 30, 1991

[30] Foreign Application Priority Data

Nov. 9, 1989 [FR] France ............... 89 14706

[51] Int. Cl.$^5$ ............... E21B 43/20; E21B 43/22
[52] U.S. Cl. ............... 166/246; 166/273; 166/305.1; 405/53; 405/128; 210/747; 210/901
[58] Field of Search ............... 166/246, 273, 274, 292, 166/305.1; 405/53, 128; 210/747, 901

[56] References Cited

U.S. PATENT DOCUMENTS

| | | | |
|---|---|---|---|
| 2,604,497 | 7/1952 | Martin | 166/273 |
| 2,975,835 | 3/1961 | Bond | 166/246 |
| 3,407,877 | 10/1968 | Harvey et al. | 166/274 |
| 3,437,141 | 4/1969 | Brandner et al. | 166/273 |
| 3,598,181 | 8/1971 | Wegner | 166/246 |
| 3,650,326 | 3/1972 | Hitzman | 166/246 |
| 3,707,194 | 12/1972 | Svaldi | 166/274 |
| 3,763,934 | 10/1973 | Coulter, Jr. et al. | 166/294 |
| 4,360,061 | 11/1982 | Canter et al. | 166/273 X |
| 4,561,502 | 12/1985 | Norton et al. | 166/273 X |
| 4,579,173 | 4/1986 | Rosensweig et al. | 166/274 X |

FOREIGN PATENT DOCUMENTS 0073612 3/1983 European Pat. Off.
0095365 11/1983 European Pat. Off.
0102269 3/1984 European Pat. Off.

Primary Examiner—George A. Suchfield
Attorney, Agent, or Firm—Oblon, Spivak, McClelland, Maier & Neustadt

[57] ABSTRACT

The invention relates to an improved method for injecting and transporting small particles in a natural porous medium. The method is characterized in that, in a first step, the porous medium is conditioned by means of an aqueous solution containing a hydrocarbonaceous compound, polymers or surface-active agents, in a second step, a plug of suspended particles is injected in the aqueous medium containing at least one hydrocarbonaceous compound, polymer or surface-active agent and, in a third step, the plug of particles is pushed by an appropriate aqueous medium. The method is particularly useful for implantation of bacteria in a porous medium.

14 Claims, 1 Drawing Sheet

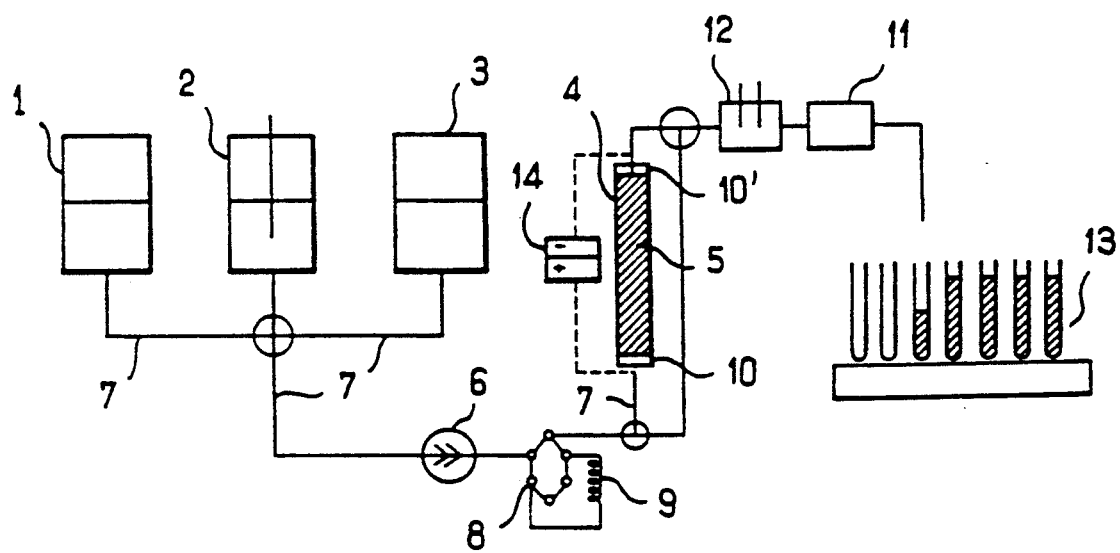

PROCESS FOR TRANSPORTING PARTICLES IN A POROUS MEDIUM

FIELD OF THE INVENTION

The subject of the present invention is an improved process for injecting and transporting particles, especially microorganisms, in a porous natural medium.

DESCRIPTION OF THE PRIOR ART

The so-called primary and secondary techniques for recovering oil, when used efficiently, lead to the extraction of not more than 35% to 40% of the crude oil contained in a reservoir. The so-called tertiary improved recovery techniques consist in extracting all or part of this residual oil especially by flushing the zone with water with the aim, either of modifying the properties of the oil in situ, or of modifying the properties of the water used for flushing, by increasing its viscosity via the addition of water-soluble organic polymers, or by reducing the phenomena of repulsion between the water and the oil via the addition of surfactants.

Another known technique, which is different in concept and application, is the closing-off of the high-permeability zones of the reservoir which are very damaging to the oil production, using high-viscosity polymers obtained, where appropriate, by cross-linkages.

The polymer compounds or surfactants used in these various types of process may be either synthetic (produced chemically) or natural (for example produced microbiologically using microorganisms, especially bacteria, which are capable of converting, via metabolism, suitable carbon substrates such as sugars or hydrocarbons).

These processes and compounds are for example described in U.S. Pat. No. 3,650,326 which relates to an assisted recovery process in which an aqueous flushing medium is used which comprises a viscosity-promoting agent produced by bacterial culture, the mixture of viscosity-promoting agent, bacteria and cultural medium being introduced into the flushing medium.

U.S. Pat. No. 3,598,181 describes a similar process, specifying the important role played by an anionic surfactant in the formation of the viscosity-promoting agent.

U.S. Pat. No. 3,763,934 describes a process for closing up permeable formations using various synthetic polymers such as polyacrylamides, cellulose derivatives and water-soluble gums.

European Patent Application No. 073 612 illustrates the use of mixtures of the biopolymer xanthan- and polyglycol-type surfactants for controlling the mobility of the solution.

Furthermore, consideration has already been given to the production in situ, inside the formation, of the biosurfactant or biopolymeric products required for the specific application considered, by injecting the microorganisms, the appropriate substrate and their nutritive elements into this formation. Such processes are described in particular in U.S. Pat. Nos. 3,340,930 and 4,522,261.

The success of the production in situ naturally depends on the selection of the appropriate strains capable of developing inside the formation environment, but also on the ability to enable the microorganism to reach its destination, that is to say the formation to be treated, without being blocked, along the long distance to be covered, in a low-permeability zone or without the microorganism meeting a growth-stimulating substrate en route which brings about its multiplication and/or the production of compounds creating a plug which can for example bring about the closing-up of the injection wells.

The success of such a process therefore depends substantially on the quality of the cell migration within the porous media which exhibit large variations in porosity and permeability. This major difficulty certainly explains why this type of process has rarely been used by the oil industry and is used essentially as an ultimate course of action when the well is intended to be closed down eventually.

SUMMARY OF THE INVENTION

The object of the invention is to overcome this disadvantage by proposing means which promote the transit of particulate suspensions, especially bacterial suspensions, through porous natural media.

These means for transporting particulate suspensions, especially bacterial suspensions, in porous media, have been studied not only with respect to processes for the improved recovery of oil, but also to any process in which there is a need to transport small, solid particles, in porous media and especially the problem of soil and ground water rehabilitation for which it may be essential to implant, and therefore to transport, bacterial suspensions which enable a purification or depollution activity to be obtained in situ microbiologically. The case of the protection of natural storage sites for which it might be advantageous to implant biological systems which improve the confinement of stored materials, may also be mentioned.

The subject of the invention is a process for injecting and propagating small, solid particles in a porous natural medium characterised in that, in a first stage, the said medium is conditioned by flushing with a balanced aqueous solution containing at least one hydrocarbon compound chosen from water-soluble or water-dispersible polymers and anionic surfactants and then, in a second stage, a plug of solid particles, suspended in a balanced aqueous medium and containing, in addition, at least one hydrocarbon compound chosen from water-soluble or water-dispersible polymers, and the anionic surfactants are injected into the said medium and, in a third stage, the said plug of particles is thrust by an appropriate aqueous medium.

BRIEF DESCRIPTION OF THE DRAWINGS

The FIGURE is a laboratory device for carrying out the experiments described in the specification.

DESCRIPTION OF THE PREFERRED EMBODIMENTS

In a preferred embodiment of the process of the invention, at least one hydrocarbon compound chosen from water-soluble or water-dispersible polymers and anionic surfactants is added to the thrust medium.

It can be stated that the hydrocarbon compounds used in each of the various stages may be identical or different. Their nature is independent of the solid particle which is injected and propagated.

The process of the invention applies to the injection and the propagation, inside porous media, of suspensions of small particles, called micron particles, that is to say whose mean diameter is not more than about $10 \times 10^{-6}$ m. The choice of the particles to be injected will depend on the specific application envisaged. These particles can be of natural and/or mineral origin, for example bentonites, clays or latex. In a preferred application of the process, they may consist of bacterial cells capable of producing in situ compounds which enable the porous medium to be treated in an satisfactory manner where they are implanted.

In a preferred application of the process of the invention, viable, non-pathogenic bacterial cells, which are used under non-proliferative conditions, are used as particles.

These bacterial cells can be for example:

aerobic Gram-negative rods or cocci, Pseudomonadaceae family; (Pseudomonas-Xanthomonas genera); Halobacteriaceae family; (Halobacterium-Halococcus genera);

facultative, anaerobic Gram-negative rods; Enterobacteriaceae family; Vibrionaceae family;

anaerobic Gram-negative bacteria; Desulfovibrio genus;

chemolithotrophic Gram-negative bacteria; Nitrobacteriaceae family; Thiobacillus/Sulfolobus genera;

methane-producing bacteria; Methanobacteriaceae family;

facultative, anaerobic Gram-positive cocci, or aerobes; Micrococcaceae family; Streptococcaceae family (Leuconostoc genus);

endospore-forming rods and cocci; Bacillaceae family (Bacillus-Clostridium genera);

-non-Sporeforming Gram-positive bacteria in the form of rods; Lactobacillaceae family;

Gram-positive bacteria belonging to the Actinomycete and related groups; Actinomycetaceae family; Nocardiaceae family; Micromonosporaceae family; Streptomycetaceae family.

The aqueous solutions or media used in the process should be balanced. Balanced is understood, in the present application, to mean an aqueous solution or medium which is compatible with the water in the porous medium to be treated, which can be achieved for example by adding the principal salts of the porous medium to be treated, to the said medium or solution. The presence of salts in the suspension is important for specific propagation of the particles injected into the porous medium. Indeed, it avoids the mobilisation of clays or any other colloidal particle present in the porous medium and, furthermore, it preserves the integrity of the particles transported, especially if they are bacterial cells, by limiting the phenomena of osmotic swelling. It is important for the fluid injected to be compatible with the chemical nature of the porous medium treated. The ionic composition of the fluid can be for example a reconstituted edgewater containing $MgCl_2$, $6H_2O$; $CaCl_2$, $2H_2O$; $K_2SO_4$; $Na_2SO_4$; $FeSO_4$, $7H_2O$; NaCl. It can be very simplified in some cases and call into play only one salt (NaCl) or a mixture of two salts NaCl and $CaCl_2$, whose proportion can be varied according to the nature of the porous medium to be treated.

The hydrocarbon compound used in one of the stages can be an anionic surface-active agent which can be used alone or mixed with other anionic or nonionic surface-active agents. The total concentration of surfactants will generally be between $10^{-5}$ mole.$l^{-1}$ and $10^{-1}$ mole.$l^{-1}$ and preferably between $10^{-5}$ and $10^{-3}$ mole.$l^{-1}$. The surface-active agent concentration in the aqueous medium will depend on the choice of the surfactant and on the geochemical nature of the formation to be treated : pH and salinity of the formation in particular. For example a surfactant concentration and the total amount to be injected will depend on the salinity of the water in the formation that is to say its alkali metal cation content and its alkaline-earth metal cation content. The higher the concentration of alkaline-earth metal cations, the higher will be the amount of surfactant to be injected, and therefore its concentration in the aqueous injection medium. On the other hand, if the salinity is due to a high concentration of alkali metal cation, the amount of surfactant required for the process will be relatively smaller than in the presence of alkaline-earth metal cations.

The following may be used for example as anionic surface-active agent:

fatty acid soaps such as the sodium or potassium salts of saturated or unsaturated $C_{10}$-$C_{24}$ fatty acids or aminocarboxylic acid derivatives such as sodium N-lauryl sarconisate, sulphates and sulphated products such as sodium lauryl sulphate type alkali metal alkyl sulphates; polyoxyethylenated fatty alcohol sulphates, polyoxyethylenated alkylphenol sulphates, polyoxyethylenated arylalkylphenol sulphates, phosphoric esters of oxyethylenated derivatives such as polyoxyethylenated fatty alcohol phosphates, polyoxyethylenated alkylphenol phosphates, polyoxyethylenated arylalkylphenol phosphates, alkali metal sulphonates such as alkyl sulphonates for example sodium dialkyl sulphosuccinate type $C_4$-$C_{30}$ acid alkyl sulphoesters, alkylbenzenesulphonates such as sodium nonylbenzenesulphonate and sodium dodecylbenzenesulphonate and lignosulphonates.

Naturally, when bacterial cells are injected, it will be ensured that a surfactant is chosen which is non-toxic to the said cells and which is compatible with the porous medium to be treated.

The hydrocarbon compound used in one of the stages can be a high molecular weight viscosity-promoting water-soluble or water-dispersible polymer. The presence of this polymer makes it possible in particular to stabilize the suspension of particles. High-molecular weight viscosity-promoting polymer is understood to mean a polymer with a molecular weight above 500,000 daltons and preferably between 1 and 10 million daltons. This polymer should not be susceptible to the action of bacteria which may be present.

The following may be mentioned as examples of polymers which may be used in the process of the invention:

synthetic polymers such as partially hydrolysed polyacrylamides, acrylamide-acrylic acid copolymers, acrylamide-acrylate copolymers, salified polyacrylates, salified polymethacrylates, partially hydrolysed polyacrylonitriles, polystyrenesulphonates, sulphonated styrene-maleic anhydride copolymers and the like, biopolymers such as xanthan, scleroglucan, dextran, polyhydroxybutyrates (PHB), mannans, pullulan, curdlan and the like, cellulose derivatives: carboxymethylcellulose (CMC), hydroxypropyl methylcellulose, carboxymethyl hydroxyethyl cellulose and the like, natural polymers: gum arabic, alginates.

The polymer content of the aqueous injection medium will be in general between 10 and 5,000 ppm and preferably between 50 and 450 ppm.

The preferred polymer of the process of the invention will be a partially hydrolysed polyacrylamide (PAA). The degree of hydrolysis will generally be between 10% and 70% and preferably between 15% and 35%.

In a variant of the process of the invention, the aqueous medium for injecting the particles in the second stage will contain, in addition to the salts, a mixture of water-soluble or water-dispersible polymers and an anionic surfactant. The polymer and surfactant contents of the aqueous injection medium will be similar to those described above for processes using the surfactant or polymer alone.

It may also be advantageous to use a polymersurfactant mixture during the first conditioning stage.

The amount of particulate suspensions, especially of bacteria, to be injected should be commensurate with the pore volume to be treated. In the case of the treatment of an oil deposit, this will involve high permeability zones which in general represent not more than a few % of the total volume of the porous medium. The amount of suspensions to be injected will take into account this pore volume to be treated as well as, to a certain extent, the pore volume of the transit zone, that is to say the distance separating the injection zone and the zone to be treated. The amount of particles to be suspended is generally between $10^5$ and $10^{10}$ particles per $cm^3$.

During implementation of the process, an aqueous fluid containing the hydrocarbon compounds without the particles is injected followed by an aqueous injection medium containing all the elements; the total amount of surfactant and/or polymer should be sufficient to ensure adequate conditioning of the zones through which the particulate suspension must pass. In general, the total volume of the solution of aqueous fluid used for the first two stages will scarcely exceed 30% of the total volume of the porous medium and will often be less than 20% of this volume, and the amount of hydrocarbon compound will be optimized as a function of the specific surface area of the porous medium.

The volume of suspension injected in the second stage, that is to say the plug, will represent in general between 10% and 50% of the volume injected in the first stage and will in general be between 2% and 10% of the total pore volume of the porous medium.

The process of the invention will be best understood on reading the examples below given merely by way of illustration.

Examples 1 to 4 below relate to bacteria belonging to the Streptococcaceae family and more particularly to the Leuconostoc genus. The bacterium is *Leuconostoc mesenteroides*.

EXAMPLES 1 to 4

The experiments were carried out in a laboratory device in which a column with a length of 18 cm and an inner diameter of 2.54 cm is filled with Entraygues sand and possesses a pore volume of 45 $cm^3$ (Vp).

This very siliceous sand (98% silica) contains very little clay and does not require prior treatment so as to avoid disturbances in the measurements carried out on the reconstituted porous media.

The particles consist of *Leuconostoc mesenteroides* bacteria cultured on a glucose-based medium and consisting of the usual nutritive elements. At the end of the exponential phase, the culture is centrifuged at 9,500 revolutions per minute for 15 minutes and washed in a 0.1 N solution of NaCl. Three centrifugation-resuspension cycles make it possible to remove the components of the culture medium which could perturb subsequent measurements.

The polymer used is 25%-hydrolysed "BASF SEPAFLOOD" polyacrylamide diluted to 250 ppm in aqueous solution (PAAH).

The anionic surfactant used is sodium dodecyl sulphate (SDS) at a concentration of $10^{-3}$ M/l.

The laboratory device used is described below with reference to FIG. 1 given herewith.

This device comprises:
- reservoirs (1), (2) and (3) containing fluids which are injected successively in a column (4) filled with the appropriate porous medium (5),
- a set of capillary tubes (7) in which the fluids, carried by a syringe pump (6), circulate,
- a six-way and a two-position injection valve (8) which makes it possible to inject a known volume of the suspension (5) contained in the injection loop (9),
- the column of porous medium (5), packed or unpacked, has dispersing ends (10) and (10') which are suitable for distributing the fluid at the inlet and at the outlet of the column, and allowing circulation both of the solutes and of the injected particles,
- two on-line detectors: a UV spectrophotometer (11) adjusted at 280 nm which provides a measurement of the optical density which is correlated with the particle concentration, and a conduct meter (12) which enables variations in salinity in the effluent to be recorded,
- a fraction collector (13) which enables subsequent additional measurements to be carried out on the effluent,
- a pressure sensor (14) at the termini of the column enabling the head loss to be evaluated.

In Example 1, the Entraygues sand constituting the porous medium was, in a first stage, flushed with a 0.1 M/l saline solution of NaCl until an effluent with a steady composition was obtained.

In a second stage, a volume of particles containing $5-7.10^8$ particles per $cm^3$ of suspension is injected, via the injection loop, into a saline solution identical to that of the first stage, pulse corresponding to 2% of the pore volume of the column (45 $cm^3$). The column is maintained under a continuous flow of the solution at a steady flow rate of 0.2 $cm^3$ $min^{-1}$ which permits push-type displacement of the volume of particles.

In Example 2, the saline solutions are replaced for all the stages by a 0.1 M/l solution of NaCl supplemented with 250 ppm of PAAH.

In Example 3, the saline solution is replaced for both the stages by a 0.1 M/l solution of NaCl supplemented with $10^{-3}$ M.$l^{-1}$ SDS.

In Example 4, Example 1 is repeated replacing the saline solution with a 0.1 M/l saline solution of NaCl supplemented with 250 ppm of PAAH and $10^{-3}$ M.$l^{-1}$ SDS.

The operating conditions for each of these examples and the results obtained, expressed as % restitution of the injected particles: number of particles recovered/number of particles, by measurement of the optical density after calibration, are summarised in Table 1 below.

It can be observed that, in the absence of the anionic hydrocarbon compounds of the process of the invention, closing-up of the column and almost total retention of the bacteria in the porous medium is obtained, which corresponds to an increase in head loss in the column (Example 1) whereas this increase in the column is practically nonexistent in Examples 2 to 4, which corresponds to an excellent percentage restitution.

TABLE 1

| No. | Particle concentration/ml | Composition of the aqueous phase (salts and additives) | Injected volume (as % of the $V_p$) | % Restitution |
|---|---|---|---|---|
| 1 | $5-7.10^8$ | NaCl: $10^{-1}$ N | 2 | 0.05 |
| 2 | $5-7.10^8$ | NaCl: $10^{-1}$ N PAA 250 ppm | 2 | 25 |
| 3 | $5-7.10^8$ | NaCl: $10^{-1}$ N SDS $10^{-3}$ M.$1^{-1}$ | 2 | 42 |
| 4 | $5-7.10^8$ | NaCl: $10^{-1}$ N PAA 250 ppm and SDS $10^{-3}$ M.$1^{-1}$ | 2 | 48 |

EXAMPLES 5 to 22

The same experiment was carried out, using various hydrocarbon compounds, on several types of solid particles (Lueconostoc mesenteroides bacteria, Bacillus subtilis bacteria, bentonite).

The precise operating conditions for the various stages and the results obtained for each of the examples are shown in Table 2 below.

The general conditions for these experiments and the abbreviations used in Table 2 are as follows:

1) CONDITIONING STAGE

The volume is expressed as $V_p$, that is to say the total pore volume of the medium.

The conditioning medium still contains 0.1 N NaCl, which is not stated in the table, supplemented, where appropriate, with:

Sodium dodecyl sulphate, $10^{-3}$ mole/l:abbreviated S
30%-hydrolysed polyacrylamide, 250 ppm: abbreviated P

2) PLUG INJECTION STAGE

The plug volume is equal to 0.02 Vp.

The injection medium contains, as particles, Leuconostoc mesenteroides bacteria, that is $10^{10}$ bacteria per ml in Examples 5 to 16, except for Example 13 where $10^9$ bacteria/ml were injected:abbreviated L.

2.5 $10^9$ *Bacillus subthis* bacteria per ml in Examples 17 and 18:abbreviated B.

100 ppm of bentonite in Examples 19 to 21: abbreviated b.

The injection medium still contains 0.1 N NaCl (not mentioned) and, where appropriate, the products termed S and P above in the same amounts, or 250 ppm of sodium lignosulphonates : abbreviated l.

3) Thrust medium

The aqueous solution will still contain 0.1 N NaCl and, where appropriate, the abovementioned products P and l in the same amounts.

Restitution of the particles injected as a volume (plug) is evaluated at the outlet of the porous medium by the amount of particles recovered for a volume of thrust medium equal to 1 Vp, expressed in % relative to the amount injected.

TABLE 2

| Ex. No. | vol (Vp) | Conditioning composition | Particle injection composition | Thrust water composition | Restitution % |
|---|---|---|---|---|---|
| 5 | 0.1 | S | L | — | 3.9 |
| 6 | 2.0 | S | L | — | 27.0 |
| 7 | — | — | L + P | — | 0.1 |
| 8 | — | — | L + P + S | — | 0.6 |
| 9 | 0.5 | S + P | L + P + S | — | 77.0 |
| 10 | sat | P | L + P | P | 70.5 |
| 11 | 0.5 | P | L + P | P | 58.0 |
| 12 | 0.2 | P | L + P | P | 53.0 |
| 13 | 0.2 | P | L + P | P | 46.0 |
| 14 | 0.2 | P | L + S | 1 | 56.0 |
| 15 | 0.2 | P | L + 1 | — | 33.0 |
| 16 | 0.2 | P | L + P + S | — | 24.7 |
| 17 | — | — | B + S | P | 15.5 |
| 18 | 0.2 | P | B + S | P | 26.5 |
| 19 | — | — | b | — | 0.1 |
| 20 | 0.2 | P | b | — | 3.0 |
| 21 | 0.2 | P | b + p | P | 33.0 |

"sat" means medium saturated with the aqueous conditioning medium

Comparison of the results obtained in these different experiments reveals a role played by each of the different stages of the process and the effect of the simultaneous use of a polymer and a surfactant.

Experiments 5 to 8 demonstrate the low efficiency of the process using only one hydrocarbon compound in only one of the stages. Only a conditioning of 2 times the pore volume, which is incompatible with a satisfactory implementation of the process (experiment 6), permits substantial transportation of particles.

In contrast, as soon as the three stages are implemented successively (experiments 11 to 14), transportation of not less than 50% of the particles is achieved after a thrust which is one-fold the pore volume.

The advantage of the thrust stage is clearly demonstrated by experiments 19 to 21. Starting with a restitution which is practically non-existent when bentonite is injected without additives, restitution to a pore volume of 33% is achieved by implementing the complete process.

It is possible to use Bacillus (experiments 17 and 18) which are particles two times larger than Leuconostoc. The restitution, which is substantial, is less satisfactory however: 26.5% compared with the 50% on average obtained above.

Sodium lignosulphonate appears to be an excellent product provided that it can be used without problems of toxicity (experiments 14 and 15).

We claim:

1. Process for injecting and propagating small, solid bacterial or mineral micron particles in a porous natural medium by promoting their transit through the porous natural medium, wherein in a first stage, the said medium is conditioned by flushing with a balanced aqueous solution containing at least one hydrocarbon compound selected from the group consisting of water-soluble polymers, water-dispersible polymers and anionic surfactants and then, in a second stage, a plug of solid particles, suspended in a balanced aqueous medium and containing, in addition, at least one hydrocarbon compound selected from the group consisting of water-soluble polymers, water-dispersible polymers and an anionic surfactant is injected into the said medium, wherein the anionic surfactant in the aqueous medium is present in an amount of between $10^{-5}$ and $10^{-1}$ M/l, and, in a third stage, the said plug of particles is thrust by an appropriate aqueous medium.

2. Process according to claim 1, wherein the aqueous thrust medium used in the third stage contains at least one hydrocarbon compound selected from the group consisting of water-soluble polymers, water-dispersible polymers and anionic surfactants.

3. Process according to any one of claims 1 and 2, wherein the polymer in the aqueous medium has a molecular mass above 500,000 daltons.

4. Process according to claim 3, wherein the polymer content of the aqueous medium is between 10 and 5,000 ppm.

5. Process according to claim 4, wherein the polymer is a natural or synthetic water-dispersible polymer.

6. Process according to claim 5, wherein the polymer is a partially hydrolyzed polyacrylamide.

7. Process according to claim 4, wherein the polymer is a partially hydrolyzed polyacrylamide.

8. Process according to claim 3, wherein the polymer is a partially hydrolyzed polyacrylamide.

9. Process according to any one of claims 1 and 2, wherein in the first conditioning stage, the porous medium is flushed with a volume of aqueous solution representing less than 30% of the total pore volume to be treated.

10. Process according to claim 9, wherein the amount of aqueous medium injected in the second stage represents 2% to 10% of the total pore volume to be treated.

11. Process according to claim 10, wherein the bacterial content of the aqueous medium is between $10^5$ and $10^{10}$ bacteria per ml.

12. Process according to any one of claims 1 and 2, wherein the polymer in the aqueous medium has a molecular mass between $1.10^6$ and $10.10^6$ daltons.

13. Process according to claim 1, wherein the aqueous medium used in the second stage simultaneously contains an anionic surface-active agent and a polymer of molecular mass above 500,000 daltons.

14. Process according to claim 13, wherein the polymer is present in an amount between 10 and 5,000 ppm.

* * * * *